United States Patent [19]

Bausch

[11] Patent Number: 5,034,668

[45] Date of Patent: Jul. 23, 1991

[54] CONTROL CIRCUIT FOR AN ELECTRIC MOTOR

[75] Inventor: James F. Bausch, West Linn, Oreg.

[73] Assignee: Synektron Corporation, Portland, Oreg.

[21] Appl. No.: 445,278

[22] Filed: Dec. 4, 1989

[51] Int. Cl.[5] .............................................. H02P 6/02
[52] U.S. Cl. .................... 318/254; 318/138; 318/723; 318/721
[58] Field of Search ............... 318/138, 254, 439, 720, 318/721, 722, 723, 724, 608

[56] References Cited

U.S. PATENT DOCUMENTS

| | | | |
|---|---|---|---|
| 4,275,343 | 6/1981 | Fulton et al. | 318/721 |
| 4,361,791 | 11/1982 | Plunkett | 318/723 |
| 4,469,997 | 9/1984 | Curtiss et al. | 318/729 |
| 4,608,527 | 8/1986 | Glennon et al. | 318/685 |
| 4,912,378 | 3/1990 | Vukosavic | 318/254 |
| 4,967,122 | 10/1990 | Rees | 318/254 |
| 4,970,445 | 11/1990 | Kimura et al. | 318/254 |

Primary Examiner—Bentsu Ro
Attorney, Agent, or Firm—Chernoff, Vilhauer, McClung & Stenzel

[57] ABSTRACT

A low noise, high bandwidth, sensorless vector control for a brushless DC motor includes a phase locked loop control having a digital counter and ROM look-up table which is responsive to a VCO to generate digital signals representing the sine and cosine of the instantaneous phase angle of the VCO. These signals are modulated by a current command and applied to a two-phase to three-phase converter. A flux sensor senses the air gap flux in the three motor coils and converts this signal to quadrature components which are compared with the output of the look-up table to derive a phase error signal that drives the VCO. Another feature of the invention is a timed self-starting network that cause the VCO frequency to ramp upwards then automatically switch to loop control without any abrupt change in the frequency of the VCO.

7 Claims, 3 Drawing Sheets

CONTROL CIRCUIT FOR AN ELECTRIC MOTOR

The following invention relates to a control circuit for an electric motor and more particularly a phased lock loop network for controlling the speed of a DC brushless motor.

Machines such as brushless DC motors and stepping motors frequently use inverters which provide timed pulses for sequentially energizing the windings. An example of this type of device is shown in copending U.S. Pat. application Ser. No. 07/270,611 filed Nov. 14, 1988 entitled "BACK EMF SAMPLING CIRCUIT FOR PHASE LOCKED LOOP MOTOR CONTROL" assigned to the same assignee, now U.S. Pat. No. 4,928,043. The motor of that application makes use of an inverter for providing switched current pulses timed for maximum efficiency, under the control of a phase locked loop. According to this drive scheme, back emf is sampled across non-energized motor windings to provide phase information for the phase locked loop.

Some variable speed motors, however, are required to come from a full stop to a desired speed very quickly. With these types of motors it is necessary to provide high gain in the feedback loop so that a very fast loop may be provided which quickly brings the speed of the motor to the desired or commanded speed. A number of motor drive schemes sense back emf or a synthesized back emf from some other measured motor parameter and provide a signal which is a function of flux. Examples are shown in Plunkett U.S. Pat. No. 4,245,181, Curtis et al., U.S. Pat. No. 4,469,997, Plunkett U.S. Pat. No. 4,361,791, Blaschke et al. U.S. Pat. No. 4,388,577 and Fulton et al. U.S. Pat. No. 4,275,343. In these motors, the signal which is proportional to flux directly controls an inverter. Phase locked loops are generally not employed. Furthermore, these drive schemes sample the back emf and the sampling frequency generates harmonics causing torque ripple which is a major contributor to noise. Torque ripple can be alleviated but only at the expense of loop bandwidth. That is, ripple components are usually higher frequency components which can be filtered, but the filtering affects the response of the loop. In general the bandwidth of the loop can only be one half the sampling rate and that rate cannot be made very high without added expense and components. Low noise and high bandwidth are competing design goals which often require trade-offs. A desirable goal would be a motor drive circuit that provided both.

As stated above, most motors which derive a flux proportional signal and use that signal as an input to an inverter do not generally make use of the phase locked loop configuration. However, phase locked loops are useful for motor starting because a known current vector may be provided to start the motor when no flux vector is present. An example of a starting technique utilizing a voltage controlled oscillator is shown in the above-mentioned patent application Ser. No. 07/270,611. That starting scheme, however, requires extra circuitry in the form of switching circuits and other components which add complexity and expense.

SUMMARY OF THE PRESENT INVENTION:

The present invention provides a low noise, high bandwidth sensorless vector control for a brushless DC machine, and in particular, for a motor which uses a signal representing flux to derive an error signal in a phase locked loop. The control circuit of the invention comprises a voltage controlled oscillator and a digital circuit responsive to the voltage controlled oscillator for generating a digital signal representing sine and cosine components of the output of the VCO. A digital-to-analog converter converts these digital signals into a two phase analog signal. A phase matrix circuit is responsive to the two phase analog signal for converting it to a multiphase motor drive signal. In the preferred embodiment this circuit is a two phase to three phase converter. A flux sensing bridge is connected to the windings of the stator for generating a multiphase signal proportional to flux. A second phase matrix circuit converts the multiphase flux signal to a two phase flux signal representing the sine and cosine flux components which is provided to a phase detector. The phase detector multiplies the two phase flux signal by the digital signals originally used to generate the two phase analog signal. The product is algebraically combined and filtered to produce a phase error signal which drives the voltage controlled oscillator.

The digital circuit may include a counter which is responsive to the output of the voltage controlled oscillator and a look-up table stored in read only memory (ROM). The look-up table includes the sine and cosine components of the instantaneous phase angle of the VCO output stored as counter increments. These same look-up table values are used in the phase detector which comprise a pair of DACS having the look-up values as the digital input and the sine and cosine values of the flux as the reference inputs. A flux sensing bridge provides the two phase flux signal input to the DACS eliminating the need for back emf sampling. Since the flux is continuously monitored and there is no sampling, harmonic components are not present, thereby permitting a wide bandwidth and high gain. The result is a very fast phase-locked loop having low noise. With this arrangement it is possible to increase the loop gain as high as desired with no attendant loss of stability.

The loop also includes a start-up circuit having a ramp voltage generator which drives the VCO from a zero condition to a nominal frequency steady state condition. When a start-up mode is entered, a timer is started, and at the same time, a switch disables the loop permitting the ramp generator to drive the VCO when no flux is yet present on the motor windings. After a predetermined period of time the ramp generator is disabled and the loop is reconnected. A feature of this start-up circuit is the use of a switching network to reconfigure a proportional integral filter, used as the output of the phase detector, as a follower circuit for the ramp generator. This provides an economy of components since the filter components can provide this dual function.

It is a primary object of this invention to provide a control circuit for a DC machine having low noise and high bandwidth.

Another object of this invention is to provide a phase-locked loop speed control for a DC motor which has very fast response to commanded changes in motor speed.

Yet a further object of this invention is to provide the aforementioned fast response phase locked loop utilizing a flux sensing bridge circuit which obviates the need for external sensors and the like.

A still further object of this invention is to provide a start-up circuit for the aforementioned phase-locked loop control circuit which automatically brings the motor from a rest position to a nominal speed and then automatically engages the control loop once the desired nominal speed has been achieved.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
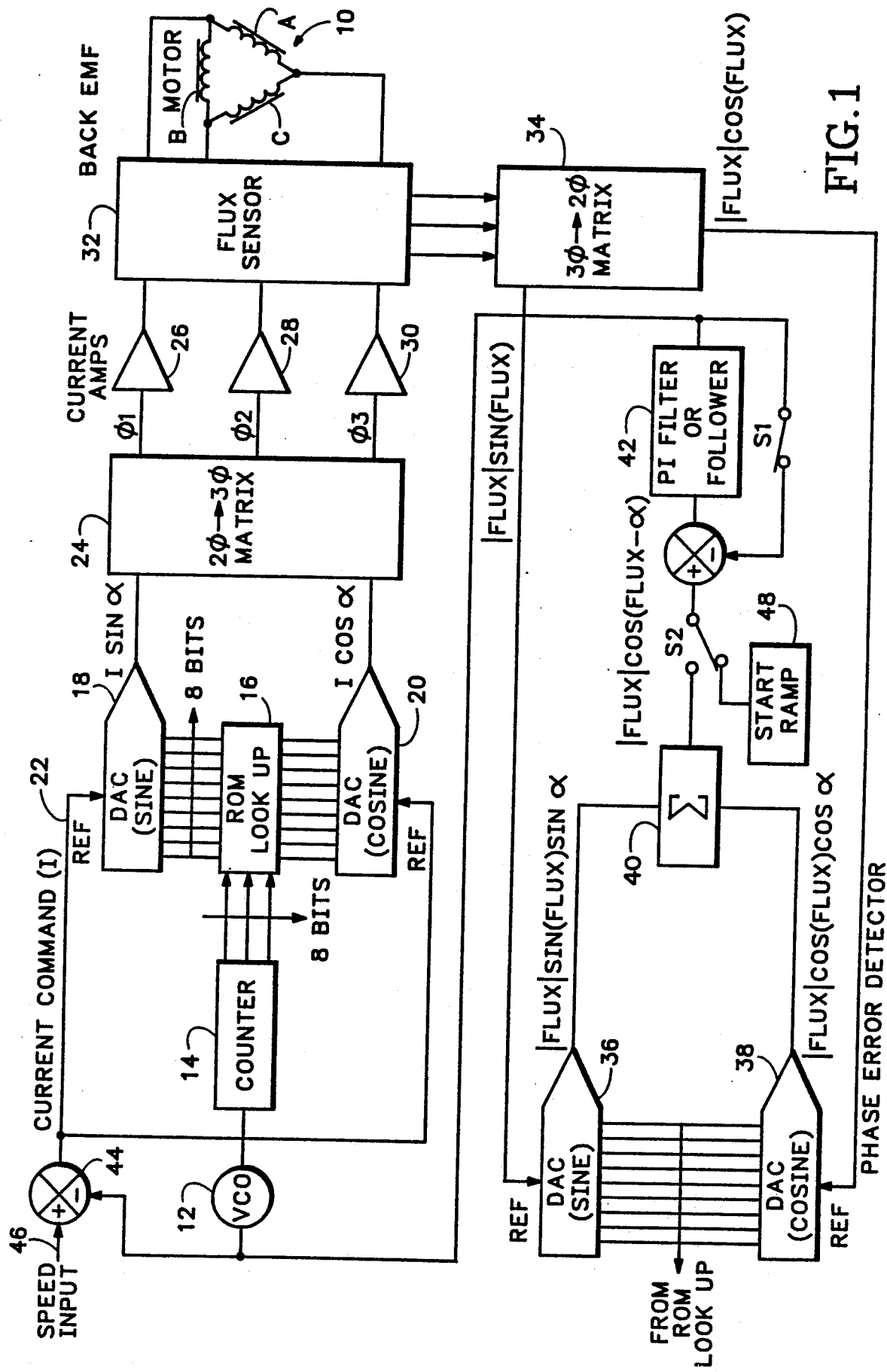
FIG. 1 is a schematic block diagram of a control circuit for a DC machine utilizing a low noise, high bandwidth phase-locked loop.

A DC brushless machine 10 includes stator coils A, B and C thus making motor 10 a three phase machine. Not shown is a rotor made of permanent magnet material making motor 10 also a synchronous machine. It is to be understood, however, that the machine 10 could have multiple phases of any number, and that the rotor need not be made of permanent magnet material. However for the asynchronous machine the phase error of flux and current must be nonzero. The flux magnitude must be controlled with this phase error if constant torque is to be maintained.

A voltage controlled oscillator (VCO) 12 is connected to a counter 14 which has an eight bit output coupled to a ROM look-up table 16. The outputs of the look-up table are connected to a pair of digital to analog converters (DACS) 18 and 20. The DACS also have a reference input connected to a current command line 22. The outputs of DACS 18 and 20, respectively, are coupled as inputs to a two phase to three phase matrix network 24. The matrix network 24 has three outputs, phase 1, phase 2 and phase 3, which are connected to respective current amplifiers 26, 28 and 30. The outputs of the three current amplifiers 26, 28 and 30 are connected to a flux sensing network 32 which includes connections to the motor windings A, B and C. Three outputs of the flux sensing network which represent air gap flux relative to coils A, B and C respectively are coupled to a three phase to two phase matrix 34 which includes two outputs carrying signals representing the sine and cosine of the flux. These outputs are connected to the reference inputs of DACS 36 and 38 respectively. The digital inputs to the DACS come from ROM look-up table 16. The output of DACS 36 and 38 are connected to a summer 40 whose output is coupled to a proportional integral filter or follower network 42. The output of filter 42 forms an input to the VCO 12 and an input to a summer 44 which is also connected to the current command input 46. Connected to the filter 42 through a switch S2 is a start-up circuit 48. Another switch S1 whose function will be explained below is connected across filter 42.

The phase of the excitation of the windings A, B and C is controlled by voltage controlled oscillator 12. The counter 14 is responsive to the VCO 12 and increments through a cycle which represents a period of the VCO output wave in which each counter increment represents the instantaneous phase of the VCO. For each incremental change in phase angle, the ROM look-up table 16 finds the appropriate value for its sine and cosine. The sine and cosine values form inputs to the DACS 18 and 20 where they are converted to analog signals. The DC level of these signals is determined by the reference input from the current command line 22. The matrix 24 converts the sine and cosine of the current into a three phase motor drive signal which is amplified in the current amplifiers 26, 28 and 30 and applied to the respective motor windings A, B and C through the flux sensor network 32.

The flux sensor network 32 includes a bridge circuit, as will be explained below, which generates signals representative of the flux for each of the coils A, B and C. The flux signals are converted in the matrix 34 to signals that represent the flux in quadrature and it is these signals that are applied as the reference inputs to DACS 36 and 38. The DACS 36 and 38 act as a phase comparator for comparing the sine and cosine of the flux signals with the sine and cosine respectively of the VCO output. In other words, the outputs of the ROM look-up table 16 are applied simultaneously to DACs 18 and 20 and 36 and 38. The output of the DACs 36 and 38 is a signal which represents the sine of the flux multiplied by the sine of the VCO phase angle (for DAC 36) and the cosine of the flux multiplied by the cosine of the VCO phase angle (for DAC 38). These signals are added in summer 40 and the resultant output is a signal representing the cosine of the flux angle minus the VCO phase angle.

During steady state operation switch S2 is closed connecting summer 40 to the proportional integral filter or follower network 42. Switch S1 is open. The output of filter 42 is an error signal which controls the frequency of VCO 12 and also forms an input in an outer feedback loop to summer 44. When the loop is locked the output of the filter 42 is a constant value that causes the VCO to oscillate at the frequency (speed) needed to comply with the SPEED command on line 46. The current command on line 22 controls the amplitude of the current and, hence, torque since the reference input acts as a multiplier to the output of DACs 18 and 20. Speed control is achieved by connecting the error signal on line 43 to the current command line 46 at summer 44.

Figure 3:
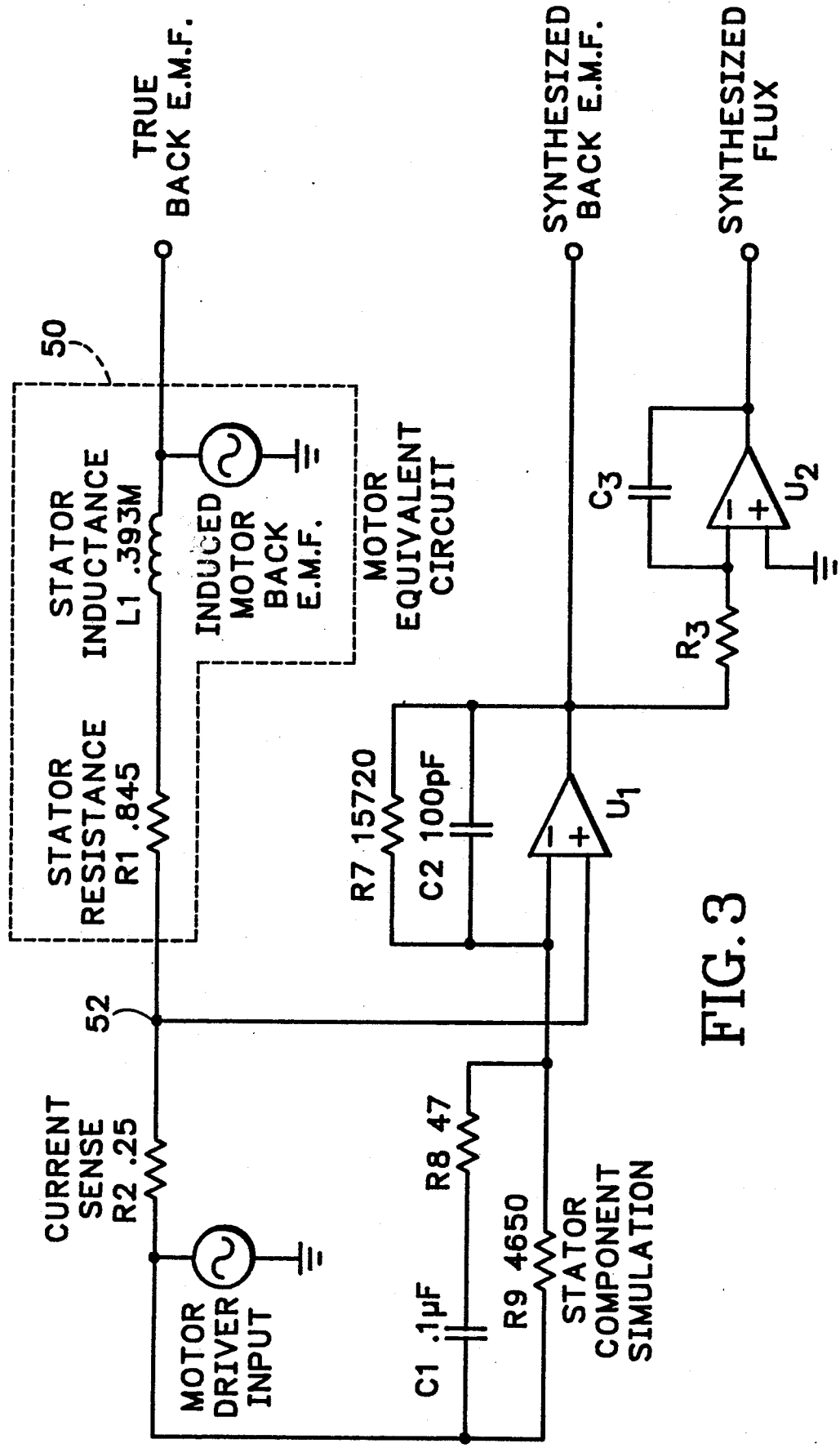
FIG. 3 is a schematic diagram of the flux sensing network of FIG. 1.

In order to provide continuous monitoring of flux and thereby avoid the need for sampling of back emf, and to avoid the use of external sensors such as Hall effect sensors, the flux sensing bridge of FIG. 3 is provided. The motor is represented by a motor equivalent circuit 50 having an impedance $Z_m$ consisting of an inductance L1 and a resistance R1. The motor equivalent circuit 50 is connected to a node 52 along with a current sensing resistor R2 and the motor drive input which collectively represents the current ampliers 26, 28 and 30. The stator components are simulated by capacitor C1, resistors R8 and R9 and have a composite impedance $Z_1$. These components are connected to the negative input of amplifier U1 while node 52 is connected to the positive terminal of amplifier U1. Connected across the negative terminal of U1 and its output is a network having an impedance $Z_1$ consisting of resistor R7 and capacitor C2. The output of amplifier U1 is connected to an integrator U2 having an input resistor R3 and shunt capacitor C3.

The components of these networks are chosen so that $Z_i = 1/Z_m$ and $Z_f = 1/R_2$. In such a case $Z_f/Z_i = Z_m/R_2$. This bridge ratio allows the generation of a signal which represents a synthesized back emf, compensating for the fact that the motor driver input must be dealt with if back emf is to be continuously monitored and sampling is to be avoided. Since the back emf is a function of the rate of change of the flux, the synthesized back emf signal may be integrated to obtain a signal that is proportional to flux.

Figure 2:
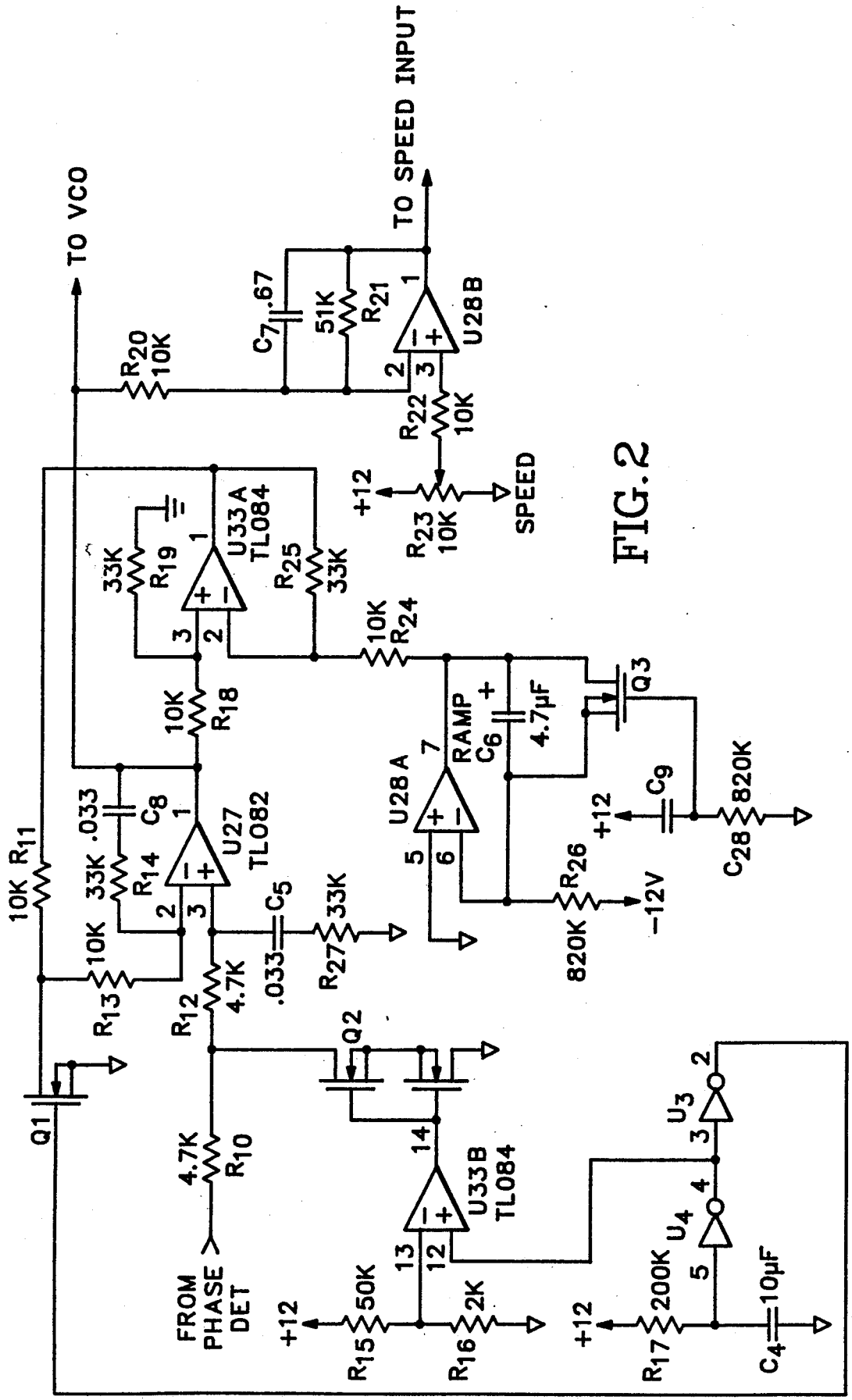
FIG. 2 is a schematic diagram of the start-up circuit, the proportional integral filter or follower network, and their associated switching circuits, all components of the network of FIG. 1.

FIG. 2 shows the circuits associated with the start-up ramp generator 48 and proportional integral filter or follower 42. Amplifier U28A is a ramp generator which produces a ramp voltage whose slope is governed by R26 and C6. A reset FET, Q3 assures that pin 7 of U28A always starts from zero. The output of U28A is applied through R24 to the negative input at pin 2 of amplifier U33A. U33A functions as a follower amplifier for U28A and has an output coupled to the input of U27 which functions as a second stage of the follower amplifier or as a proportional integral filter as will be explained below. The same input to U27 is connected to a FET Q1 which functions as switch S1 in FIG. 1. The output of the phase detector section and in particular the output of summer 40 is connected through R10 and R12 to the positive input of U27. A switch S2 comprises a pair of FETs Q2 which are connected to ground. Pin 14 of U33B is connected to the gates of Q2, and U33B has a positive input on pin 12 that is connected to a twelve volt power supply through R17, C4 and logical inverter U4. Logical inverter U3 inverts the output of U4 and connects it to the gate of Q1.

When a start-up mode is entered such as by turning the unit on, the motor is at rest and there is no output from the VCO 12. Upon start-up the twelve volt power supply is turned on which begins to charge C4. Because of inverters U4 and U3 pin 12 of U33 is high at start-up and thus pin 14 is high turning on Q2. Q2 shorts the input from the phase detector to ground, effectively opening the loop (S2 is now open). Also upon start-up the twelve volt power supply applied across C9 turns on Q3 discharging C6 momentarily, assuring that the voltage on pin 7 of U28A is zero as the start-up mode is entered. U28A is powered by the negative twelve volt supply through R26 and provides a linear ramp voltage at a rate determined by C6. This ramp voltage is amplified by U33A and U27 and appears at the input to the VCO 12. The output of U27 is also connected through R20 to pin 2 of U28 which corresponds to summing amplifier 44 in FIG. 1. The speed command for the motor 10 comes from potentiometer R23 which is coupled through R22 to the positive input of U28B.

When C4 becomes charged, the gate to Q1 goes sufficiently high to turn on Q1 shorting the output of U33A to ground. This disables the ramp generator U28A, eliminating it from the loop. At the same time, pin 12 of U33B goes low. This turns off Q2 allowing the phase detector input to drive U27, which with U33A grounded, is now configured as a proportional integral filter. Thus U27 and U33A perform a dual function, following the ramp voltage in the start-up mode, and after a predetermined time, switching to a configuration in which U27 functions as a proportional integral filter. This provides for an economy of components, saving both expense and space. A by-product of this arrangement is that there is no perturbation in the output of U27 when the timing circuit (C4 and R17) cause the loop to be connected. At the instant the loop is connected, the output of U27 remains steady because its voltage is already controlling the VCO at transition, and because integrating effect of the filter will smooth any otherwise abrupt voltage changes.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A control circuit for an electric machine, said machine having a plurality of stator windings energized by a motor drive signal comprising:
   (a) a voltage controlled oscillator;
   (b) digital circuit means responsive to the voltage controlled oscillator for generating digital signals representing two phase components of an output of the voltage controlled oscillator and DAC means for converting said digital signals to a two phase analog signal;
   (c) a first phase matrix circuit for converting the two phase analog signal to a multi-phase motor drive signal;
   (d) flux sensor means coupled to the electric machine for sensing a signal proportional to the back emf in at least selected stator windings of said machine and for generating a multi-phase flux signal indicative of the flux in said windings;
   (e) a second phase matrix circuit for converting the multi-phase flux signal to a two phase flux signal;
   (f) phase detector means comprising means for comparing said two phase flux signal with said digital signals generated by said digital circuit means to produce a phase error signal; and
   (g) filter means for coupling said phase error signal to said voltage controlled oscillator.

2. The control circuit of claim 1 wherein said digital circuit means further comprises a counter coupled to said voltage controlled oscillator and a readonly memory coupled to an output of the counter for generating said digital signals.

3. The control circuit of claim 2 wherein said DAC means includes reference signal input means for establishing a reference current output level for the components of the two phase analog signal.

4. The control circuit of claim 3 wherein said read only memory comprises a look-up table wherein each value stored in the look-up table represents digital sine and cosine components of the output of the voltage controlled oscillator.

5. The control circuit of claim 1 wherein said flux sensor means includes bridge circuit means for synthesizing a signal representing back emf on each of the windings of said machine from the voltages on said windings.

6. The control circuit of claim 5 wherein the bridge circuit means includes a network comprising integrator means responsive to said signal representing back emf for providing a magnetic flux signal.

7. The control circuit of claim 6 wherein said filter means comprises a proportional integral filter and includes an integrating amplifier.

* * * * *

UNITED STATES PATENT AND TRADEMARK OFFICE
CERTIFICATE OF CORRECTION

PATENT NO. : 5,034,668
DATED : July 23, 1991
INVENTOR(S) : James F. Bausch

It is certified that error appears in the above-indentified patent and that said Letters Patent is hereby corrected as shown below:

Col. 4, Line 60: delete "$Z_1$" insert --$Z_i$--

Col. 4, Line 65: delete "$Z_1$" insert --$Z_f$--

Signed and Sealed this

Fourteenth Day of September, 1993

Attest:

BRUCE LEHMAN

*Attesting Officer*        *Commissioner of Patents and Trademarks*